US007571861B2

(12) United States Patent
Eke et al.

(10) Patent No.: US 7,571,861 B2
(45) Date of Patent: Aug. 11, 2009

(54) EMBOSSING SYSTEMS AND METHODS

(75) Inventors: Daniel A. Eke, Andover, MN (US); Michael G. Veehoff, St. Paul, MN (US); Duncan A. McCannel, Eagan, MN (US); William Cahill, Eagan, MN (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

(21) Appl. No.: 11/475,728

(22) Filed: Jun. 27, 2006
(Under 37 CFR 1.47)

(65) Prior Publication Data

US 2007/0095920 A1 May 3, 2007

Related U.S. Application Data

(60) Provisional application No. 60/695,042, filed on Jun. 29, 2005.

(51) Int. Cl.
*G06K 19/00* (2006.01)
*G06F 17/00* (2006.01)
*G06K 5/00* (2006.01)

(52) U.S. Cl. ........................ 235/487; 235/375; 235/380

(58) Field of Classification Search ................. 235/487, 235/494, 375, 380; 156/553
See application file for complete search history.

(56) References Cited

U.S. PATENT DOCUMENTS

| | | | | |
|---|---|---|---|---|
| 4,091,910 | A * | 5/1978 | Bolton et al. | 400/131 |
| 4,817,528 | A * | 4/1989 | Baker | 101/395 |
| 7,384,003 | B1 | 6/2008 | Boyer et al. | |
| 2004/0144472 | A1 * | 7/2004 | Cowie | 156/64 |
| 2006/0175018 | A1 * | 8/2006 | Biller | 156/553 |

OTHER PUBLICATIONS

U.S. Appl. No. 60/581,534, Boyer et al. (provisional application filed Jun. 21, 2004).

* cited by examiner

*Primary Examiner*—Thien M. Le
*Assistant Examiner*—April A Taylor
(74) *Attorney, Agent, or Firm*—Moore & Hansen, PLLP

(57) ABSTRACT

Systems and methods of embossing flat pieces (such as thin cards and similar materials) that prevent the embossed pieces from sticking to each other during subsequent handling. In some embodiments, pieces are manufactured in rows and columns on a large sheet, with (typically) the distance between text embossed on adjacent rows and (particularly) the distance between texts embossed on cards from adjacent columns being constant. Cards that will be stacked immediately adjacent each other after the cards are cut from the large sheet have text embossed on them that varies, so that the cards cannot tightly nest against each other and stick together.

9 Claims, 3 Drawing Sheets

John Q. Customer is written in normal 12 point Times New Roman.

Jane Q. Customer is an example of different alphanumeric information.

J o h n  Q .  C u s t o m e r  i s  a n  e x a m p l e  o f  e x p a n d e d  t e x t .

John Q. Customer is an example of condensed text.

John Q. Customer is an example of a different typeface, specifically Arial.

John Q. Customer is an example of a larger typesize, specifically 16 point.

*John Q. Customer is an example of a different font, specifically Times New Roman Italic.*

John Q. Customer is written with expanded spacing compared to this text.

John Q. Customer is written with reduced spacing compared to this text.

Figure 3

EMBOSSING SYSTEMS AND METHODS

CROSS REFERENCE TO RELATED APPLICATION

This application claims the benefit of provisional application No. 60/695,042 filed Jun. 29, 2005.

TECHNICAL FIELD

This invention relates to methods and systems for embossing flat pieces (such as thin cards and similar materials), as well as the embossed flat pieces themselves.

BACKGROUND

As described in U.S. Published Patent Application 2005/0028922, now U.S. Pat. No. 7,029,547, there is a need for systems and methods of embossing flat pieces (such as thin cards and similar materials) that prevent the embossed pieces from sticking to each other during subsequent handling. The entire disclosures of U.S. Published Patent Application 2005/0028922 and U.S. Pat. No. 7,029,547 are incorporated by reference for the purposes of establishing vocabulary and other context for this invention.

SUMMARY

The invention may be embodied in systems and methods of embossing flat pieces (such as thin cards and similar materials) to prevent the embossed pieces from sticking to each other during subsequent handling. The embodiments may be the embossed pieces themselves, either alone or in combination with each other (e.g., a group or collection of pieces having certain embossing patterns). Unlike the approach disclosed in U.S. Published Patent Application 2005/0028922 and U.S. Pat. No. 7,029,547, the location of the information on the card is not necessarily offset from card to card. A wide variety of methods may be employed to differentiate the information embossed on one card from that embossed on another card.

BRIEF DESCRIPTION OF THE DRAWINGS

The figures illustrate, in a schematic manner, at least one preferred embodiment of the invention.

FIG. 2 is deliberately modeled on FIG. 2 of U.S. Published Patent Application 2005/0028922 and U.S. Pat. No. 7,029,547 to emphasize the distinctions between this embodiment of the invention and the invention disclosed in that application and patent.

FIG. 3 is a reproduction of a portion of this specification.

DETAILED DESCRIPTION

Embodiments of the invention are particularly applicable to the need for high volumes of embossed cards for direct mail advertising programs. For example, one type of campaign uses so-called "placebo" cards that have the appearance of actual credit cards, but in fact are not capable of functioning as working credit cards (for example, placebo cards typically display a fake, non-activated account number, if they display any number at all). Since one type of actual credit card uses embossed information, the campaign is more effective if the placebo card is also embossed. The traditional process for embossing actual cards uses equipment that embosses variable information on cards, one card at a time. Because this process is designed to emboss different information on each card, it is very slow and expensive. Users of direct mail campaigns want the same look as actual cards, but because the cards are placebos, the campaign does not require (and for reasons of cost does not necessarily desire) variable information on each card.

Traditional paper and plastic embossing systems thus use the same embossed image in the same position on each of several cards manufactured in full sheets (e.g., one hundred twenty cards in a ten-by-twelve pattern). This is an inexpensive process, but causes problems in downstream operations, such as, for example, affixing the card to a carrier, if a carrier is used in card production. This is because the embossed portions of adjacent cards nest together when the cards are stacked on top of each other. One approach to this problem is the use of offset embossing, as disclosed in U.S. Published Patent Application 2005/0028922, and U.S. Pat. No. 7,029,547, noted above.

In general terms, embodiments of the invention are improvements on the technology disclosed in U.S. Published Patent Application 2005/0028922 and U.S. Pat. No. 7,029,547. The embodiments of the invention rely upon improved embossing methods (and systems of implementing such methods) as compared to the approaches disclosed in those documents. Thus, it should be understood that text of those documents that is not specifically directed to the embossing pattern of those documents is, by being incorporated by reference here, also descriptive of this invention and therefore will not be repeated verbatim. For example, the discussion of selection of materials is equally applicable to embodiments of this invention because such selections do not depend on whether the embossing pattern is offset or not. Other disclosure is similarly applicable to embodiments of this invention unless obviously excluded by the claims that follow.

Figure 2:
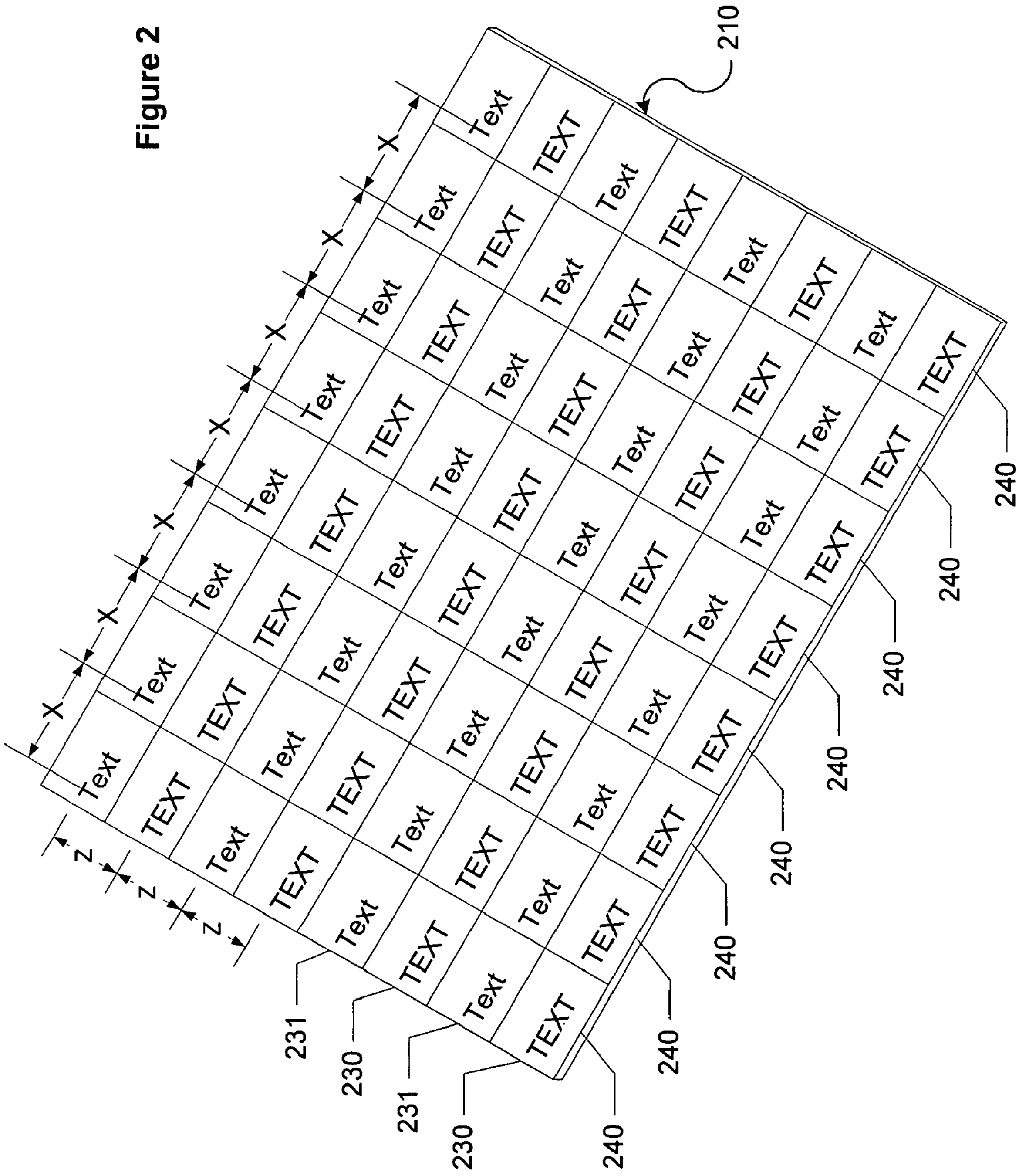
FIG. 2 is a perspective view of an embossing die suitable for use in some embodiments of the invention, illustrating the preferred embodiment in which the distance between columns is not offset, i.e., X is a constant for all columns, and the actual contents of the text (indicated in the Figure as TEXT and Text) varies from row to row.

Specifically, in one embodiment of this invention, cards are laid out in rows on a large sheet. Information is embossed in the same position on each card, but the information is different from one row of cards to the next. It is possible, but not required, to offset the rows as described in U.S. Published Patent Application 2005/0028922 and U.S. Pat. No. 7,029,547, in addition to the use of different information, but this is not preferred because it adds unnecessary complexity to the process. It has been found sufficient to simply vary the information from row to row, as illustrated in FIG. 2, without varying the distance between columns of information. That is, embodiments of this invention do not employ "offset" as that term is used in U.S. Published Patent Application 2005/0028922 and U.S. Pat. No. 7,029,547.

Figure 1:
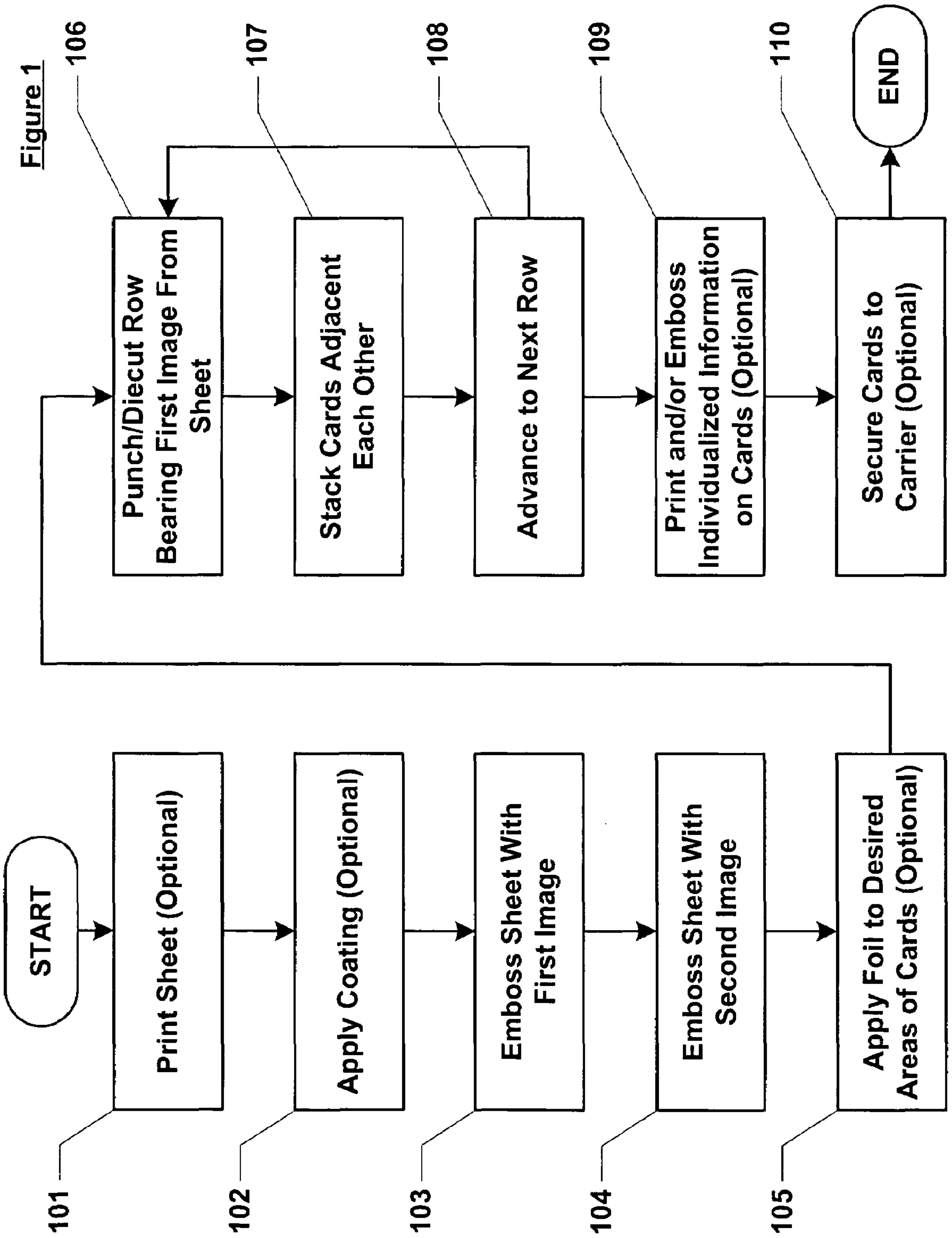
FIG. 1 schematically illustrates process aspects of embodiments of the invention.

Referring generally to FIG. 1, the methods of embossing that may be used in embodiments of this invention include optional steps of conventional printing 101 and coating 102. Traditional platen press embossing and male-female punch press embossing may be employed at 103, 104. Optional foil application 105 is accomplished either by flat stamping the large sheet using a traditional platen press, and then embossing the flat stamp image on a platen press or on a punch press. The optional foil application may also be accomplished by tipping hot foil onto the embossed image either in-line on a punch press or on a separate pass, using a heated roller or other device to apply the foil to the embossed area.

In 106 and 108, cards are cut into individual cards by row (preferably, but not necessarily) in a punch press using a male/female die. The first row is punched at 106 and the individual cards are collected in stacks at 107. The sheet advances (or, equivalently, the table suupporting the sheet advances), the next row is cut at 108, and the cards are added to the stack on top of the previous row punched at 106. This is repeated until the sheet is moved all the way through the cutting stage (i.e., punch press in the preferred embodiment). Alternatively, instead of cutting sheets row-by-row, it is possible to cut entire sheets that alternatively bear different information (i.e., the cards of one entire sheet bear the same information, but alternating sheets have cards bearing different information). In this instance, the sheets may be collated prior to cutting, or they may be alternatively fed into the apparatus from individual stacks of sheets bearing like information.

Because the embossed cards are stacked on top of cards with different information, they do not nest with each other. Optionally, individual cards may have individualized information added at 109, and/or the cards may be placed on a carrier sheet or equivalent support at 110.

FIG. 2 illustrates a preferred embodiment in which the actual contents of the text (schematically indicated in the Figure as TEXT and Text) varies on sheet 210 from row 230 to row 231. The location of the text is constant from card to card, as indicated by the constant values X (spacing between text on cards in adjacent columns 240) and Z (row-to-row spacing). To preserve the authentic appearance of the placebo card, the actual text chosen for variation may be innocuous, such as the name of the card issuer which often appears in both upper case and lower case in other marketing materials and advertisements. Thus, it is likely that any consumer will find a card reading either AMERICAN EXPRESS or American Express to appear authentic. Note that the distinctions between upper case and lower case letters, even in the absence of any difference in the words made out by those letters, are sufficient to create different information for purposes of this invention. That is because the shapes of the individual letters, not just the linguistic content of the words, carry "information" in the context of rendering one card sufficiently distinguishable from another card to prevent the two cards from sticking to each other.

There are many other parameters that may be varied to differentiate the information from card to card. They include variations in one or more (i.e., in combination with each other) of the following: changes in alphanumeric information (e.g., "John Q. Customer" v. "Jane Q. Customer"); changes in typeface (e.g., Times New Roman v. Arial), font (e.g., Times New Roman v. Times New Roman Italic), or size (e.g., 12 point v. 16 point), with the preferred amount of change being in the range of approximately 80 to 100 percent when comparing the size of text on one card to that of another card; distances between lines of alphanumeric characters (also known as leading), distances between pairs of adjacent individual alphanumeric characters on the same line (also known as kerning), and distances between groups of adjacent individual alphanumeric characters on the same line (also known as tracking), and so on. In this regard, "alphanumeric" should be understood to include not only alphabetical and numerical characters, but also those so-called extended characters and symbolic characters commonly associated with a typeface, such as small capitals, ligatures, dash, asterisk, and the like; and further it should be understood that multiple languages (e.g., English, Spanish, Chinese and so on) are within the scope of the term. See Felici, J., *The Complete Manual of Typography* (Berkeley: Adobe Press), 1st Ed., 2003, which is incorporated by reference.

Examples of such changes appear below and in FIG. 3.

John Q. Customer is written in normal 12 point Times New Roman.

Jane Q. Customer is an example of different alphanumeric information.

J o h n Q. C u s t o m e r i s a n e x a m p l e o f e x p a n d e d t e x t .

John Q. Customer is an example of condensed text.

John Q. Customer is an example of a different typeface, specifically Arial.

John Q. Customer is an example of a larger typesize, specifically 16 point.

*John Q. Customer is an example of a different font, specifically Times New Roman Italic.*

John Q. Customer is written with expanded spacing compared to this text.

John Q. Customer is written with reduced spacing compared to this text.

It is possible, but not required, to implement an improved (and therefore preferred) manufacturing sequence for the production of cards. In one embodiment of the process aspect of the invention, sheets of cards are foil stamped first (preferred equipment is manufactured by Bobst), embossed (again, preferred equipment is manufactured by Bobst), collated (by hand, although mechanized collating is possible) and then die cut (again, preferred equipment is manufactured by Bobst, although conventional punch presses are also suitable). These are four separate operations. Use of multiple, distinct, separate operations or "stages" is common in sheet-fed printing, and commonly requires separate pieces of machinery as well as some means of moving the intermediate states of product from one stage to another. Separate stages cause considerable waste of product, time, energy, and profit in the form of machinery purchase and maintenance, as well as added manpower to oversee the complicated process.

It is preferred to combine one or more of these operations into a single workflow. For example, first cards in sheet form are embossed, and the embossed sheets directly enter an in-line foiling unit attached to the back side of the embossing equipment (e.g., punch press). (In this context, "in-line" refers to handling product without any intervening staging operations.) The foil is applied to the peaks of the embossed alphanumeric characters as the sheet leaves the embossing die. This provides improved registration of the foil to the embossing, as well as resulting in one less operation. An optional further improvement is to place the punching operation directly in-line after the foil station for an even more efficient work setup. It is also believed that the embossing, foiling and punching operations could be included a single progressive die.

In this application, the term "offset" is used to denote a change in position on the plane of the card, i.e., a change in X or Y coordinates. The term "different" is used to denote a change in information or other aspect that does not involve position. Two cards may vary from each other in terms of either or both of these.

We claim:

1. A method of making embossed cards comprising:

a) optionally printing static information on a sheet of material;

b) embossing the sheet in a pattern of rows and columns with information that comprises alphanumeric characters having linguistic content, such that the information: (i) is embossed in the same position on each card, but (ii) differs from one row of cards to the next due to changes in the characters without changes in the linguistic content of the characters;

c) cuffing cards from the sheet; and d) stacking the cards.

2. The method of claim 1, in which the changes in the letters are changes in a parameter selected from the group consisting of: size, leading, and kerning.

3. The method of claim 1, in which the changes in the letters are changes in a parameter selected from the group consisting of: typeface, font, and tracking.

4. An embossing system, comprising:

a) an embossing die and a receiving die, in which the embossing die has information comprising alphanumeric characters having linguistic content, the information being disposed on a die surface such that when the embossing die and the receiving die are pressed together, with a sheet of material disposed between the embossing die and the receiving die, the information is embossed into the sheet in a pattern of rows and columns such that the information is embossed in the same position on each card, but is different from one row of cards to the next or from one column of cards to the next due to changes in the characters but without change in the linguistic content of the characters;

b) a card cutting apparatus to cut individual cards from the sheet of material; and c) means for receiving adjacently stacked cards having embossed information which is differentiated from one another.

5. The system of claim 4, in which the changes in the characters are changes in a parameter selected from the group consisting of: size, leading, and kerning.

6. The system of claim 4, in which the changes in the characters are changes in a parameter selected from the group consisting of: typeface, font, and tracking.

7. A set of embossed cards, in which individual cards in the set are embossed with information, the information comprising alphanumeric characters having linguistic content, in a pattern of rows and columns such that the information: (1) is embossed in the same position on each card, but (2) is different from one row of cards to the next due to changes in the characters but without change in the linguistic content of the characters.

8. The set of claim 7, in which the changes in the characters are changes in a parameter selected from the group consisting of: size, leading, and kerning.

9. The set of claim 7, in which the changes in the characters are changes in a parameter selected from the group consisting of: typeface, font, and tracking.

* * * * *